(12) United States Patent
Ritter et al.

(10) Patent No.: US 9,198,349 B2
(45) Date of Patent: Dec. 1, 2015

(54) ARTICULATED HARVESTING HEAD GROUND FORCE CONTROL CIRCUIT

(71) Applicant: DEERE & COMPANY, Moline, IL (US)

(72) Inventors: Aaron S. Ritter, Milan, IL (US); Benjamin M Lovett, Colona, IL (US); Bruce A Coers, Hillsdale, IL (US)

(*) Notice: Subject to any disclaimer, the term of this patent is extended or adjusted under 35 U.S.C. 154(b) by 124 days.

(21) Appl. No.: 13/940,311

(22) Filed: Jul. 12, 2013

(65) Prior Publication Data

US 2015/0013795 A1 Jan. 15, 2015

(51) Int. Cl.
*A01D 67/00* (2006.01)
*A01D 41/14* (2006.01)

(52) U.S. Cl.
CPC ............ *A01D 41/145* (2013.01); *A01D 41/141* (2013.01); *Y10T 137/87169* (2015.04); *Y10T 137/87209* (2015.04)

(58) Field of Classification Search
CPC ............ F15B 13/0401; F15B 13/0405; F15B 2013/0409; F15B 13/0416; A01D 41/144; A01D 41/14; A01D 41/141; A01D 41/145; A01B 63/1013; A01B 63/10
USPC .......... 91/461, 418; 60/459; 56/208
See application file for complete search history.

(56) References Cited

U.S. PATENT DOCUMENTS

| 3,468,107 | A  | * | 9/1969  | Van Der Lely ............... 56/11.9 |
| 5,170,692 | A  | * | 12/1992 | Lonnemo ..................... 91/461 |
| 5,911,625 | A  | * | 6/1999  | von Allworden ............. 460/119 |
| 7,191,582 | B2 | * | 3/2007  | Bomleny ..................... 56/10.2 E |
| 7,360,351 | B2 | * | 4/2008  | Rickert et al. ................. 56/228 |
| 7,404,283 | B2 | * | 7/2008  | Viaud .............................. 56/228 |
| 7,430,846 | B2 | * | 10/2008 | Bomleny et al. ............ 56/10.2 E |
| 7,520,115 | B2 | * | 4/2009  | Coers et al. ..................... 56/15.8 |
| 8,555,607 | B2 | * | 10/2013 | Coers et al. ..................... 56/181 |
| 8,635,842 | B2 | * | 1/2014  | Markt ............................ 56/15.2 |
| 2003/0074876 | A1 | * | 4/2003  | Patterson et al. ............... 56/257 |
| 2003/0226342 | A1 | * | 12/2003 | Boeckmann et al. .......... 56/14.7 |
| 2004/0123575 | A1 | * | 7/2004  | Rickert .......................... 56/14.7 |
| 2005/0109001 | A1 | * | 5/2005  | Wolters et al. ............. 56/16.4 R |
| 2007/0289278 | A1 | * | 12/2007 | Coers et al. ..................... 56/14.4 |
| 2009/0071666 | A1 | * | 3/2009  | Ehrhart et al. ..................... 172/1 |
| 2009/0235626 | A1 | * | 9/2009  | Fackler et al. .............. 56/10.2 E |

FOREIGN PATENT DOCUMENTS

| CA | 2665589 A1 | 11/2010 |
| EP | 2520152 A1 | 11/2012 |
| EP | 2583545 A1 | 4/2013 |
| GB | 1106002 A  | 3/1968 |

OTHER PUBLICATIONS

European Search Report issued in counterpart application No. 14172882.4, dated Feb. 5, 2015 (5 pages).

* cited by examiner

*Primary Examiner* — Árpád Fábián-Kovács (57) ABSTRACT

A ground force control circuit (162) for an articulated harvesting head is provided that comprises, an ECU (164); and a first hydraulic control valve (166, 170) driven by the ECU (164), wherein the first hydraulic control valve (166, 170) is coupled to at least one actuator (158, 160) and is configured to maintain a constant pressure in the at least one actuator (158, 160).

4 Claims, 4 Drawing Sheets

ARTICULATED HARVESTING HEAD GROUND FORCE CONTROL CIRCUIT

FIELD OF THE INVENTION

This invention relates to agricultural harvesting equipment. More particularly, it relates to agricultural harvesting heads. Even more particularly, it relates to articulated agricultural harvesting head heads and circuits for controlling their down-force against the ground.

BACKGROUND OF THE INVENTION

Agricultural harvesting heads such as draper platforms are designed to follow closely along the ground harvesting crops. To ensure that they follow the ground closely, they are configured to contact the ground and apply a slight ground force to the ground. Hydraulic electric circuits are typically provided to ensure that only a small portion of their weight is actually pressed against the ground. As the ground rises and falls underneath the agricultural harvesting head, the position of the agricultural harvesting head is adjusted up and down with respect to the agricultural combine on which the agricultural harvesting head is supported. This permits the agricultural harvesting head to adjust to changing terrain.

In recent years, articulated agricultural harvesting heads have been designed. Articulated heads comprise two or more elongated sections that are hinged to each other. As the terrain changes, each section rises and falls with respect to the ground independently of the other sections.

One problem in articulated agricultural harvesting heads is maintaining a relatively constant and light force against the ground. In a three section articulated agricultural harvesting head, for example, the two end sections are hingeably connected to a center section. The center section is supported on the agricultural combine itself. The two outer hinged sections are supported on the ground, and also are supported on the center section itself. To maintain a constant ground force of the two outer hinged sections against the ground, some of their load must be transferred to the center section. Yet the center section must also be maintained at a relatively constant ground force against the ground. This transfer of loads between the sections and to the agricultural combine itself is difficult.

In CA 2,665,589 A1, the outer hinged sections of the agricultural harvesting head are supported on wheels. As the terrain changes, the terrain pushes against the wheels, which in turn raises and lowers the outer hinged sections with respect to the center section. One drawback to this arrangement is the increase in weight due to the wheels required to support the wing sections.

In US 2003/074876 A1, an arrangement of linkages, levers, and springs are used to couple the outer sections of the agricultural harvesting head to the central section. One drawback to this arrangement is the added weight and complexity of the linkages, levers, and springs.

The Geringhoff company has a draper called "Triflex" that uses an accumulator (a hydraulic spring) to control the down-force applied to the ground.

What is needed, therefore, is an improved arrangement for supporting the outer sections of an articulated agricultural harvesting head and controlling their ground force.

It is an object of this invention to provide such an arrangement.

SUMMARY OF THE INVENTION

In accordance with one aspect of the invention, a ground force control circuit for an articulated harvesting head is provided, the articulated harvesting head including a center section, a left section, and a right section, wherein the left section is hingeably coupled to the center section that extends leftward therefrom, wherein the right section is hingeably coupled to the center section and extends rightward therefrom, wherein a first actuator is pivotally coupled to the center section and to the left section to pivot the left section with respect to the center section, wherein a second actuator is pivotally coupled to the center section and to the right section to pivot the right section with respect to the center section, the ground force control circuit comprising: an ECU; and a first hydraulic control valve driven by the ECU, wherein the first hydraulic control valve is coupled to at least one actuator of the first actuator and the second actuator and is configured to maintain a constant pressure in the at least one actuator.

The first hydraulic control valve may also be driven by a first pilot signal provided by a first pilot hydraulic line.

The first pilot hydraulic line may be coupled to a hydraulic fluid port of said at least one actuator.

The first pilot signal may indicate a hydraulic fluid pressure in said at least one actuator.

The ECU may control a solenoid of the first hydraulic control valve.

The solenoid may be configured to counter a force applied to the first hydraulic control valve applied by the first pilot signal.

In accordance with another aspect of the invention, the ground force control circuit may further comprise a second hydraulic control valve driven by the ECU, and the second hydraulic control valve may be coupled to at least a second actuator of the first actuator and the second actuator, wherein the second hydraulic control valve is configured to maintain a constant pressure in the at least a second actuator.

The first hydraulic control valve may also be driven by a first pilot signal provided by first pilot hydraulic line and the second hydraulic control valve may also be driven by a second pilot signal provided by a second pilot hydraulic line.

The first pilot hydraulic line may be coupled to a first hydraulic fluid port of said at least one actuator, and the second pilot hydraulic line may be coupled to a second hydraulic fluid port of said at least a second actuator.

The first pilot signal may indicate a hydraulic fluid pressure in said at least one actuator, and the second pilot signal may indicate a hydraulic fluid pressure in said at least a second actuator.

The ECU may control a first solenoid of the first hydraulic control valve, and the ECU may control a second solenoid of the second hydraulic control valve.

In accordance with another aspect of the invention, the center section may be configured to be supported on a feederhouse, the feederhouse may be supported on a combine harvester vehicle, and at least another actuator may be coupled to the feederhouse to vertically move the feederhouse with respect to the combine harvester vehicle, and the ground force control circuit may further comprise a second hydraulic control valve, driven by the ECU, wherein the second hydraulic control valve is coupled to said at least another actuator and further wherein the second hydraulic control valve is configured to maintain a constant pressure in said at least another actuator.

The first hydraulic control valve may also be driven by a first pilot signal provided by a first pilot hydraulic line, and the second hydraulic control valve may also be driven by a second pilot signal provided by a second pilot hydraulic line.

The first pilot hydraulic line may be coupled to a first hydraulic fluid port of said at least one actuator, and the second pilot hydraulic line may be coupled to a second hydraulic fluid port) of said at least a second actuator.

The first pilot signal may indicate a hydraulic fluid pressure in said at least one actuator, and further the second pilot signal may indicate a hydraulic fluid pressure in said at least a second actuator.

The ECU may control a first solenoid of the first hydraulic control valve, and the ECU may control a second solenoid of the second hydraulic control valve.

In accordance with another aspect of the invention, the ground force control circuit may further comprise a third hydraulic control valve driven by the ECU, and the third hydraulic control valve may be coupled to at least another actuator of the first actuator and the second actuator and the third hydraulic control valve may be configured to maintain a constant pressure in said at least another actuator.

DETAILED DESCRIPTION

The term "side-to-side", "sideways", "laterally" or "lateral" refer to a direction that is horizontal and generally parallel to the longitudinal extent of the agricultural harvesting head itself. This direction is perpendicular to a direction of travel "V" of the machine as it travels through the field harvesting crops. The terms "in front of", "front", "forward", "fore" and the like refer to the direction of travel "V". The terms "back", "rear", "behind", "to the rear of" and the like refer to a direction opposite to the direction of travel "V".

Figure 1:
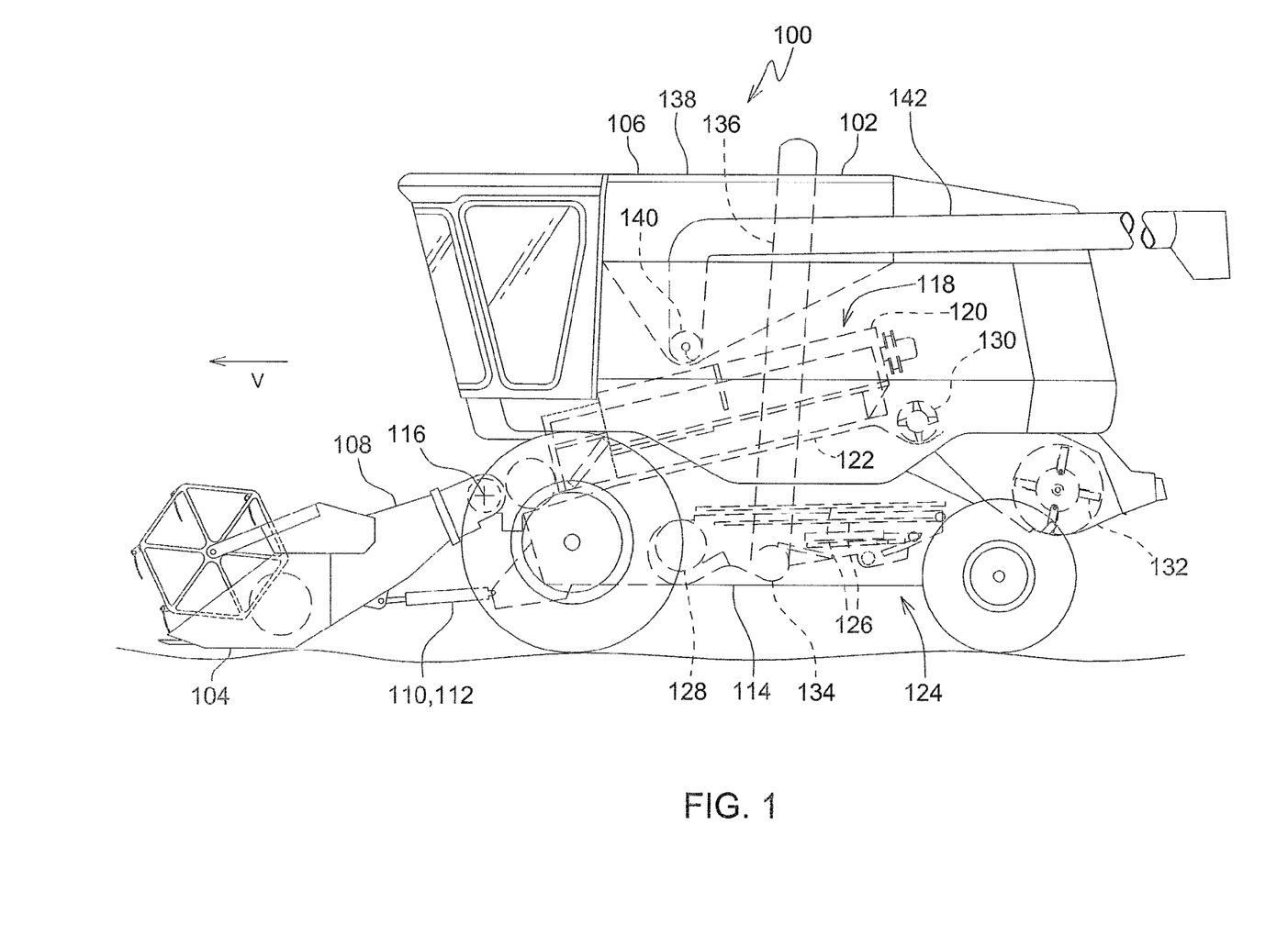
FIG. 1 is a side view of a combine harvester and agricultural harvesting head in accordance with the present invention.

FIG. 1 illustrates an agricultural harvesting vehicle 100 including a combine harvester 102 and an agricultural harvesting head 104 supported on the front of the combine harvester 102.

The combine harvester includes a combine harvester vehicle 106 and a feederhouse 108 pivotally coupled to the front of the combine harvester vehicle 106.

A first single-acting actuator 110 and a single-acting second actuator 112 are coupled to and between the feederhouse 108 and the chassis 114 to support the forward end of the feederhouse 108 and the agricultural harvesting head 104 above the ground.

When the first actuator 110 and the second actuator 112 are extended, the forward end of the feederhouse 108 and the agricultural harvesting head 104 are raised upward, pivoting clockwise (in FIG. 1) about a pivot joint 116 that couples the feederhouse 108 to the chassis 114.

When the first actuator 110 and the second actuator 112 are retracted, the forward end of the feederhouse 108 and the agricultural harvesting head 104 are lowered, pivoting counterclockwise (in FIG. 1) about the pivot joint 116.

Thus, by extending and retracting the first actuator 110 and the second actuator 112, the height of the feederhouse 108 and the agricultural harvesting head 104 can be varied. Furthermore, merely changing the hydraulic fluid pressure in the first actuator 110 and the second actuator 112 will change the amount of downforce exerted by the agricultural harvesting head 104 against the ground. As the hydraulic fluid pressure in the first actuator 110 and the second actuator 112 increases, the downforce applied by the agricultural harvesting head 104 to the ground will decrease. As the hydraulic fluid pressure in the first actuator 110 and the second actuator 112 decreases, the downforce applied by the agricultural harvesting head 104 to the ground will increase.

In an alternative arrangement, the first actuator 110 and the second actuator 112 can be electric or pneumatic devices such as linear or rotary motors.

The combine harvester vehicle 106 receives crop cut by the agricultural harvesting head 104 and conveys it into a threshing system 118. The threshing system 118 includes a rotor 120 that rotates against the concave 122. This separates the grain from the material other than grain (MOG). The grain falls downward into a cleaning system 124. The cleaning system 124 includes at least one sieve or chaffer 126. The cleaning system 124 also includes a fan 128 that blows air through the sieve or chaffer 126. This airflow levitates light MOG and carries it rearward where it is deposited on the ground.

A re-thresher 130 is provided at the rear of the threshing system 118 to receive the MOG separated from the grain in the threshing system 118. Grain that is further separated from the MOG in the re-thresher 130 drops into the cleaning system 124. The MOG leaves the threshing system 118 and is conveyed backward into a chopper 132, which throws the MOG onto the ground behind the combine harvester vehicle 106.

The grain that is cleaned in the cleaning system 124 is carried to an auger 134 that carries the clean grain to one side of the combine harvester vehicle 106. An elevator 136 receives the clean grain from the auger 134 and lifts the clean grain upward depositing it into a grain tank 138.

Periodically, an unloading vehicle such as a grain truck or grain cart will travel alongside the combine harvester vehicle 106 and an auger 140 in the grain tank will unload the grain tank 138 through an elongate outlet 142. The elongate outlet 142 is pivoted outward from the combine harvester vehicle 106 to extend over the grain truck or grain cart which receives the clean grain and carries it away for storage.

Figure 2:
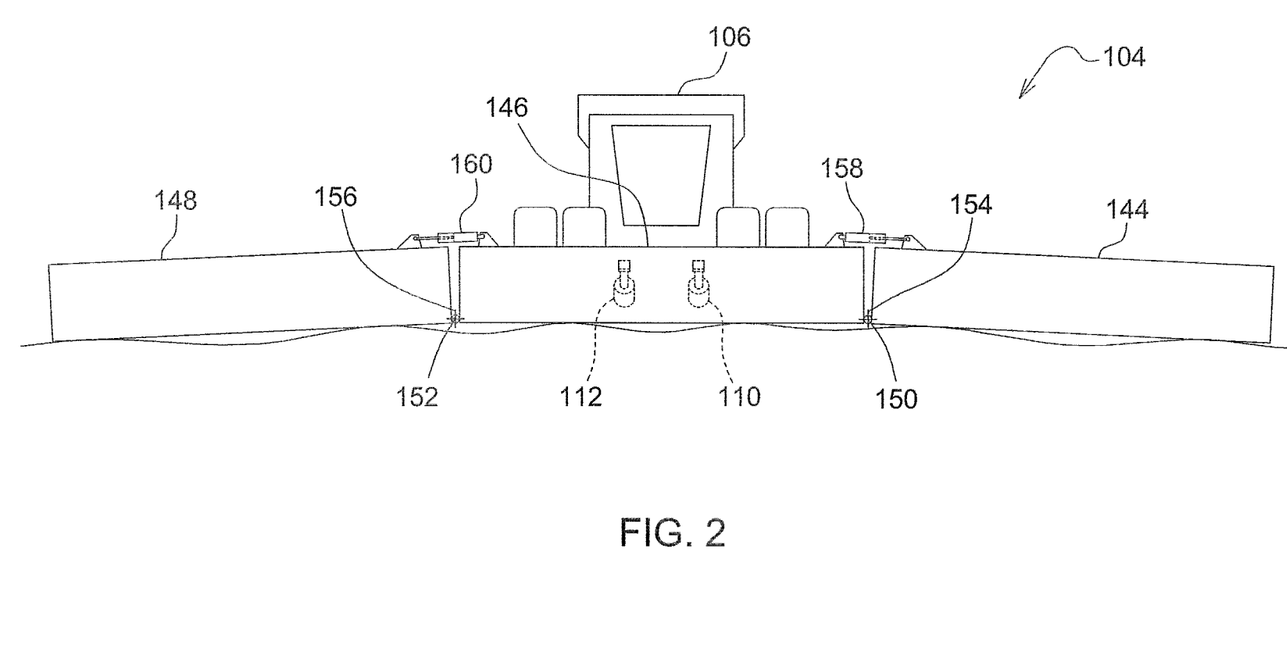
FIG. 2 is a front view of the arrangement of FIG. 1.

As shown in FIG. 2, the agricultural harvesting head 104 comprises three sections, a left section 144, a center section 146, and a right section 148. The left section 144 is hingeably connected to the center section 146 by a hinge joint 150. The right section 148 is hingeably connected to the center section 146 by a hinge joint 152. The hinge joint 150 and the hinge joint 152 to constrain the left section 144 and the right section 148 to pivot with respect to the center section 146 about a first generally horizontal and forwardly extending axis 154 and about a second generally horizontal and forwardly extending axis 156, respectively.

A third actuator 158, here shown as a hydraulic cylinder, is attached to and between the left section 144 and the center section 146.

When the third actuator 158 extends, it permits the left section 144 to pivot downwardly (i.e. clockwise in FIG. 2). When the third actuator 158 retracts, it pivots the left section 144 upwardly (i.e. counterclockwise in FIG. 2).

When the fourth actuator 160 extends, it permits the right section 148 to pivot downwardly (i.e. counterclockwise in FIG. 2). When the fourth actuator 160 retracts, it pivots the right section 148 upwardly (i.e. clockwise in FIG. 2).

When hydraulic pressure to the third actuator 158 is increased, it reduces the downforce exerted by the left section 144 against the ground. When hydraulic pressure to the third actuator 158 is decreased, it increases the downforce exerted by the left section 144 against the ground.

When hydraulic pressure to the fourth actuator 160 is increased, it reduces the downforce exerted by the right section 148 against the ground. When hydraulic pressure to the fourth actuator 160 is decreased, it increases the downforce exerted by the right section 148 against the ground.

Figure 3:
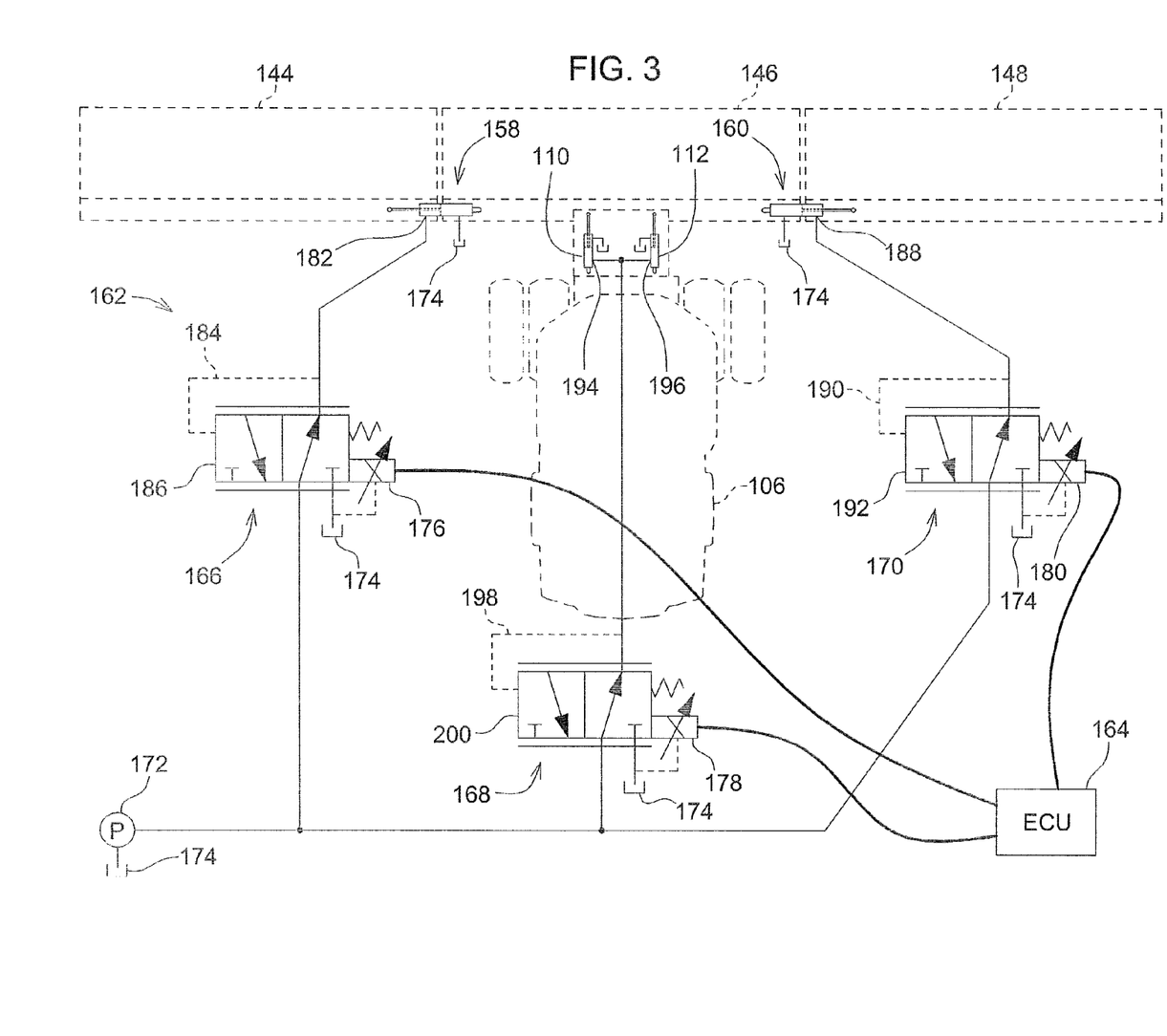
FIG. 3 is a plan view of the arrangement of FIGS. 1-2 with a first ground force control circuit arrangement.

In FIG. 3, a ground force control circuit 162 comprises an ECU 164, a first hydraulic control valve 166, a second hydraulic control valve 168, a third hydraulic control valve 170 and the hydraulic fluid conduits that interconnect these elements.

The ECU 164 is of conventional arrangement, comprising a digital microprocessor or microcontroller coupled to a volatile digital memory (RAM), a nonvolatile memory (ROM), and valve driver circuits. The ECU 164 may be a single ECU, or it may be multiple ECUs networked together using a serial or parallel communication bus to provide the capabilities described herein.

The ground force control circuit 162 is connected to and controls the first actuator 110, the second actuator 112, the third actuator 158, and the fourth actuator 160. A hydraulic fluid pressure source 172 and a hydraulic fluid reservoir 174 are coupled to the ground force control circuit 162 to complete the hydraulic circuit.

The first hydraulic control valve 166 is a pilot compensated proportional control valve actuated by a first solenoid coil 176. The first solenoid coil 176 is coupled to the ECU 164 to be controlled thereby.

The second hydraulic control valve 168 is a pilot compensated proportional control valve actuated by a second solenoid coil 178. The second solenoid coil 178 is coupled to the ECU 164 to be controlled thereby.

The third hydraulic control valve 170 is a pilot compensated proportional control valve actuated by a third solenoid coil 180. The third solenoid coil 180 is coupled to the ECU 164 to be controlled thereby.

The first hydraulic control valve 166 has a hydraulic fluid port that is coupled to the hydraulic fluid pressure source 172 to receive hydraulic fluid under pressure therefrom and to apply it to the hydraulic fluid port 182 of the third actuator 158 to apply hydraulic fluid under pressure to the rod end of the third actuator 158.

When hydraulic fluid is forced into the third actuator 158, the third actuator 158 retracts, thereby lifting the left section 144. When hydraulic fluid is released from the third actuator 158, the third actuator 158 extends, thereby lowering the left section 144.

A pilot hydraulic line 184 is coupled to the hydraulic fluid port 182. The pressure in the pilot hydraulic line 184 is applied to one end of the spool 186 of the first hydraulic control valve 166.

Increasing hydraulic fluid pressure in the third actuator 158 tends to cause the spool 186 to shift to the right (in FIG. 3). This rightward movement of the spool 186 releases hydraulic fluid from the third actuator 158 and returns it to the hydraulic fluid reservoir 174.

Decreasing hydraulic fluid pressure in the third actuator 158 tends to cause the spool 186 to shift to the left (in FIG. 3). This leftward movement of the spool 186 connects the third actuator 158 to the hydraulic fluid pressure source 172, which tends to fill the third actuator 158 and increase the hydraulic fluid pressure in the third actuator 158.

Thus, when hydraulic fluid pressure increases in the third actuator 158, hydraulic fluid is automatically released from the third actuator 158 until the hydraulic fluid pressure returns to a pressure set point. Similarly, when hydraulic fluid pressure decreases in the third actuator 158, hydraulic fluid is automatically supplied to the third actuator 158 until hydraulic fluid pressure returns to the pressure set point.

In this manner, the pilot hydraulic line 184 and its interconnections with the rest of the circuit tend to maintain a constant hydraulic fluid pressure in the third actuator 158.

The pressure set point in the third actuator 158 is adjusted by the ECU changing the electrical current flowing through the first solenoid coil 176.

As the current flowing to the first solenoid coil 176 increases, the hydraulic fluid pressure in the third actuator 158 correspondingly and responsively increases. As the hydraulic fluid pressure in the third actuator 158 increases, the force of the left section 144 against the ground is correspondingly and responsively decreases. It does this since the increased hydraulic pressure in the third actuator 158 tends to lift the left section 144 off the ground. The increasing hydraulic pressure in the third actuator 158 transfers a portion of the weight of the left section 144 to the center section 146. This transfer of weight increases the ground force that the center section 146 applies against the ground.

The third hydraulic control valve 170 has a hydraulic fluid port that is coupled to the hydraulic fluid pressure source 172 to receive hydraulic fluid under pressure therefrom and to apply it to the hydraulic fluid port 188 of the fourth actuator 160 to apply hydraulic fluid under pressure to the rod end of the fourth actuator 160.

When hydraulic fluid is forced into the fourth actuator 160, the fourth actuator 160 retracts, thereby lifting the right section 148. When hydraulic fluid is released from the fourth actuator 160, the fourth actuator 160 extends, thereby lowering the right section 148.

A pilot hydraulic line 190 is coupled to the hydraulic fluid port 188. The pressure in the pilot hydraulic line 190 is applied to one end of the spool 192 of the first hydraulic control valve 166.

Increasing hydraulic fluid pressure in the fourth actuator 160 tends to cause the spool 192 to shift to the right (in FIG. 3). This rightward movement of the spool 192 releases hydraulic fluid from the fourth actuator 160 and returns it to the hydraulic fluid reservoir 174.

Decreasing hydraulic fluid pressure in the fourth actuator 160 tends to cause the spool 192 to shift to the left (in FIG. 3). This leftward movement of the spool 192 connects the fourth actuator 160 to the hydraulic fluid pressure source 172, which tends to fill the fourth actuator 160 and increase the hydraulic fluid pressure in the fourth actuator 160.

Thus, when hydraulic fluid pressure increases in the fourth actuator 160, hydraulic fluid is automatically released from the fourth actuator 160 until the hydraulic fluid pressure returns to a pressure set point. Similarly, when hydraulic fluid pressure decreases in the fourth actuator 160, hydraulic fluid is automatically supplied to the fourth actuator 160 until hydraulic fluid pressure returns to the pressure set point.

In this manner, the pilot hydraulic line 190 and its interconnections with the rest of the circuit tend to maintain a constant hydraulic fluid pressure in the fourth actuator 160.

The pressure set point in the fourth actuator 160 is adjusted by the ECU changing the electrical current flowing through the third solenoid coil 180.

As the current flowing to the third solenoid coil 180 increases, the hydraulic fluid pressure in the fourth actuator 160 correspondingly and responsively increases. As the hydraulic fluid pressure in the fourth actuator 160 increases, the force of the right section 148 against the ground is correspondingly and responsively decreases. It does this since the increased hydraulic pressure in the fourth actuator 160 tends to lift the right section 148 off the ground. The increasing hydraulic pressure in the fourth actuator 160 transfers a portion of the weight of the right section 148 to the center section 146. This transfer of weight increases the ground force that the center section 146 applies against the ground.

The second hydraulic control valve 168 has a hydraulic fluid port that is coupled to the hydraulic fluid pressure source 172 to receive hydraulic fluid under pressure therefrom and to apply it to the hydraulic fluid port 194 of the first actuator 110 to apply hydraulic fluid under pressure to the cylinder end of the first actuator 110. The same hydraulic fluid port applies hydraulic fluid under pressure to the hydraulic fluid port 196 of the second actuator 112. Both the first actuator 110 and the second actuator 112 are coupled together in common to receive hydraulic fluid from and to send hydraulic fluid to the second hydraulic control valve 168.

When hydraulic, fluid is forced into the first actuator 110 and the second actuator 112, the first actuator 110 and the second actuator 112 extend, thereby lifting the feederhouse 108, the center section 146, the left section 144, and the right section 148.

When hydraulic fluid is released from the first actuator 110 and the second actuator 112, the first actuator 110 and the second actuator 112 retract, thereby lowering the feederhouse 108, the center section 146, the left section 144, and the right section 148.

A pilot hydraulic line 198 is coupled to the hydraulic fluid port 194 and the hydraulic fluid port 196. The pressure in the pilot hydraulic line 198 is applied to one end of the spool 200 of the second hydraulic control valve 168.

Increasing hydraulic fluid pressure in the first actuator 110 and the second actuator 112 tends to cause the spool 200 to shift to the right (in FIG. 3). This rightward movement of the spool 200 releases hydraulic fluid from the first actuator 110 and the second actuator 112 and returns it to the hydraulic fluid reservoir 174.

Decreasing hydraulic fluid pressure in the first actuator 110 and the second actuator 112 tends to cause the spool 200 to shift to the left (in FIG. 3). This leftward movement of the spool 200 connects the first actuator 110 and the second actuator 112 to the hydraulic fluid pressure source 172, which tends to fill the first actuator 110 and the second actuator 112 and increase the hydraulic fluid pressure in the first actuator 110 and the second actuator 112.

Thus, when hydraulic fluid pressure increases in the first actuator 110 and the second actuator 112, hydraulic fluid is automatically released from the first actuator 110 and the second actuator 112 until the hydraulic fluid pressure returns to a pressure set point. Similarly, when hydraulic fluid pressure decreases in the first actuator 110 and the second actuator 112, hydraulic fluid is automatically supplied to the first actuator 110 and the second actuator 112 until hydraulic fluid pressure returns to the pressure set point.

In this manner, the pilot hydraulic line 198 and its interconnections with the rest of the circuit tend to maintain a constant hydraulic fluid pressure in the first actuator 110 and the second actuator 112.

The pressure set point in the first actuator 110 and the second actuator 112 is adjusted by the ECU changing the electrical current flowing through the second solenoid coil 178.

As the current flowing to the second solenoid coil 178 increases, the hydraulic fluid pressure in the first actuator 110 and the second actuator 112 correspondingly and responsively increases. As the hydraulic fluid pressure in the first actuator 110 and the second actuator 112 increases, the force of the center section 148 against the ground is correspondingly and responsively decreased. It does this since the increased hydraulic pressure in the first actuator 110 and the second actuator 112 tends to lift the center section 148 off the ground. The increasing hydraulic pressure in the first actuator 110 and the second actuator 112 transfers a portion of the weight of the center section 146 (and the left section 144 and the right section 148 which are supported on the center section 146) to the chassis 114 of the combine harvester vehicle 106. This transfer of weight decreases the ground force that the center section 146 applies against the ground.

In the arrangement of FIG. 3, the ECU 164 has the capability of independently controlling the downforce of the left section 144 against the ground and the downforce of the right section 148 against the ground.

In normal operation, however, the operator wants to have the same downforce of the left section 144 and the right section 148 against the ground. For this operator, there is no need to independently regulate the downforce of the left section 144 and the right section 148. For this reason, an alternative arrangement that uses fewer parts is provided and illustrated in FIG. 4.

Figure 4:
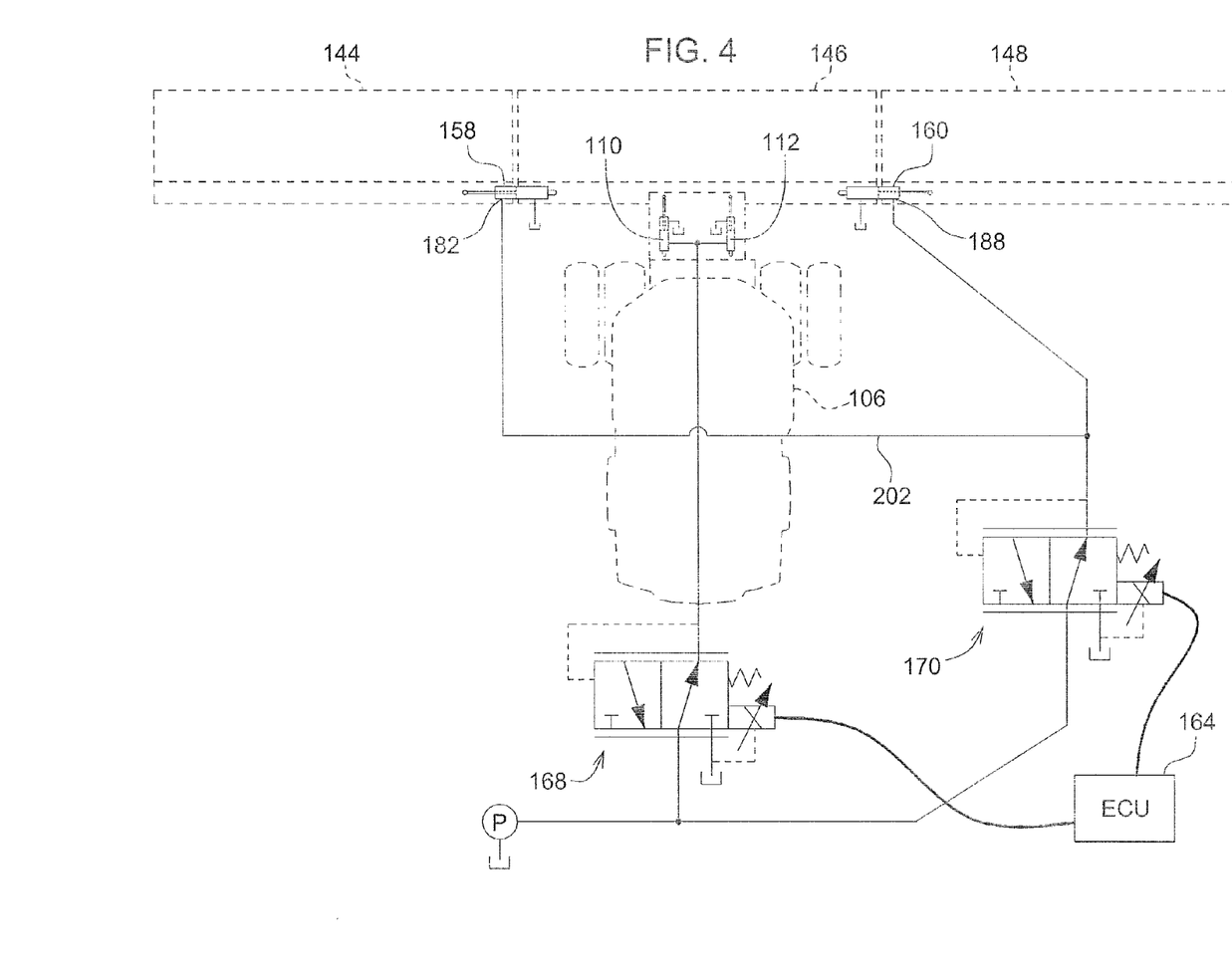
FIG. 4 is a plan view of the arrangement of FIGS. 1-2 with an alternative ground force control circuit arrangement.

In the arrangement of FIG. 4, instead of having a separate first hydraulic control valve 166 and third hydraulic control valve 170, a single hydraulic control valve is provided that is coupled to both the first actuator 110 and the second actuator 112. The arrangement of FIG. 4 is alike in every functional and mechanical respect to the arrangement of FIG. 3, except the output of the third hydraulic control valve 170 is coupled in parallel to both the first actuator 110 and the second actuator 112. For that reason, we have not repeated the description of the third hydraulic control valve 170 below. Then have only noted that the output of the third hydraulic control valve 170 is connected in parallel to a hydraulic circuit 202 to the first actuator 110 and the second actuator 112.

In all the arrangements above, the operator can change the pressure set point for each of the actuators by signaling the ECU 164 to change the signal transmitted to the corresponding solenoid of the hydraulic control valve. Regardless of the pressure set point commanded by the ECU 164, the particular pressure set by the ECU 164 is maintained constant by the operation of the actuator hydraulic fluid pressure which is conducted through the pilot hydraulic lines 184, 190, 198 to their respective hydraulic control valves. A hydraulic accumulator may be employed in addition to the illustrated circuits (for example to handle extremely rapid changes in accumulator pressure that the hydraulic control valves alone are incapable of compensating for) but is not necessary.

It should be understood that the particular embodiments shown and discussed herein are not the only ways in which the invention can exist. They are the currently preferred embodiments of the invention. One skilled in the art of agricultural harvester and agricultural harvesting head design and manufacture can readily see other variations that would also fall within the scope of the appended claims.

For example, the articulated harvesting head illustrated herein has three sections: a center section, a left section, and a right section. Alternatively, the articulated harvesting head could have two sections: a left section, and a right section. Alternatively, the articulated harvesting head could have four sections: two left sections and two right sections. Alternatively the articulated harvesting head could have five sections: a center section, two left sections, and two right sections.

As another example, each hydraulic control valve can be sized relatively small and a hydraulic accumulator coupled to the actuator controlled by that hydraulic control valve in this arrangement, the hydraulic accumulator can accommodate rapid excursions of the actuator while the hydraulic control valve can respond at of somewhat slower rate to bring the pressure in the actuator back to the constant pressure commanded by the ECU (164).

We claim:

1. A ground force control circuit (162) in combination with an articulated harvesting head (104) extending longitudinally in a direction perpendicular to a forward direction of travel (V) of the harvesting head (104), the articulated harvesting head (104) including a center section (146), a left section (144), and a right section (148), wherein a first hinge joint (150) defines a horizontal first pivot axis (154) extending in the direction of travel (V) and hingeably couples the left section (144) to the center section (146) for vertical movement relative to the center section (146), wherein a second hinge joint (152) defines a horizontal second pivot axis (156) extending in the direction of travel (V) and hingeably couples the right section (148) to the center section (146) for vertical movement relative to the center section (146), wherein a first single-acting hydraulic actuator (158) is pivotally coupled to the center section (146) and to the left section (144) to pivot the left section (144) vertically about the first pivot axis (154) with respect to the center section (146), and wherein a second single-acting hydraulic actuator (160) is pivotally coupled to the center section (146) and to the right section (148) to pivot the right section (148) vertically about the second pivot axis (156) with respect to the center section (146), and the ground force control circuit (162) comprising:
 an ECU (164) configured for receiving selectively commanded actuator pressure set-point input signals and for sending out a pressure set-point control signal corresponding to each commanded pressure set-point input signal;
 a source of fluid pressure (172);
 a sump (174);
 a first solenoid-operated, proportional hydraulic control valve (166, 170) hydraulically coupled to at least one of said first single-acting hydraulic actuator (158) and said second single-acting hydraulic actuator (160), to said sump (174) and to said source of fluid pressure (172), the at least first hydraulic control valve (166, 170) having a solenoid (176, 180) coupled for receiving each pressure set-point control signal from said ECU (164) and shifting in response to receiving each desired pressure set-point control signal for coupling said source of fluid pressure (172) to said at least one of said first and second single-acting hydraulic actuators (158, 160) for respectively establishing each said desired set-point pressure in said at least one of said first and second single-acting hydraulic actuators (158, 160); and
 a pilot pressure line coupled between said at least one of said first and second single-acting hydraulic actuators (158 and 160) and said first hydraulic control valve (166, 170) for acting in opposition to a force established by the electrically responsive element (176, 180) such as to maintain said set-point pressure in said at least one of said first and second single-acting hydraulic actuators (158 and 160) so as to maintain a constant pressure in the at least one actuator (158, 160).

2. The ground force control circuit (162) of claim 1, further comprising:
 a second solenoid-operated proportional hydraulic control valve (166, 170) having a second solenoid coupled for receiving each pressure set-point control signal from the ECU (164), wherein the second solenoid-operated, proportional hydraulic control valve (166, 170) is coupled to a second actuator (158, 160) of the first actuator (158) and the second actuator (160), to said sump (174) and to said source of fluid pressure (172), the second solenoid-operated proportional hydraulic control valve (166, 170) having a second solenoid (176, 180) coupled for receiving each pressure set-point control signal from said ECU (164) and causing said second solenoid-operated proportional hydraulic control valve (166, 170) to shift in response to receiving each desired pressure set-point control signal for coupling said source of fluid pressure (172) to said second single-acting hydraulic actuator (158, 160) for respectively establishing each said desired set-point pressure in said second single-acting hydraulic actuator (158, 160); and
 a second pilot pressure line coupled between said second single-acting hydraulic actuator (158, 160) and said second hydraulic control valve (166, 170) for acting in opposition to a force established by the solenoid (176, 180) such as to maintain said set-point pressure in said second single-acting hydraulic actuator (158, 160) so as to maintain a constant pressure in the second actuator (158, 160).

3. The ground force control circuit (162) of claim 1, and further including a combine harvester vehicle (106) and a feederhouse (108), wherein the center section (146) is supported on the feederhouse (108) for vertical movement with the feederhouse (108), wherein the feederhouse (108) is supported on the combine harvester vehicle (106) for moving vertically relative to the combine harvester vehicle (106), and further wherein at least another single-acting hydraulic actuator (110, 112) is coupled between the vehicle and the feederhouse (108) to vertically move the feederhouse (108) with respect to the combine harvester vehicle (106), the ground force control circuit (162) further comprising:
 a second solenoid-operated proportional hydraulic control valve (168) having a second solenoid coupled for receiving each pressure set-point control signal from the ECU (164), wherein the second solenoid-operated proportional hydraulic control valve (168) is coupled to said at least another single-acting hydraulic actuator (110, 112), to said sump (174) and to said source of fluid pressure (172), the second solenoid-operated proportional hydraulic control valve (168) having a second solenoid (178) coupled for receiving each pressure set-point control signal from said ECU (164) and causing said second solenoid-operated proportional hydraulic control valve (168) to shift in response to receiving each desired pressure set-point control signal for coupling said source of fluid pressure (172) to said at least another single-acting hydraulic actuator (110, 112) for respectively establishing each said desired set-point pressure in said second single-acting hydraulic actuator (168); and
 a second pilot pressure line (198) coupled between said at least another single-acting hydraulic actuator (110, 112) and said second hydraulic control valve (168) for acting in opposition to a force established by the solenoid (178) such as to maintain said set-point pressure in said at least another single-acting hydraulic actuator (110, 160) so as to maintain a constant pressure in the at least another actuator (110, 112).

4. The ground force control circuit (162) of claim 3 further comprising:
 a third solenoid-operated proportional hydraulic control valve (166, 170) including a third solenoid (176, 180) coupled for receiving each pressure set-point control signal from the ECU (164), wherein the third solenoid-operated proportional hydraulic control valve (166, 170) is coupled to another single-acting hydraulic actuator (158, 160) of the first single-acting hydraulic actuator (158) and the second single-acting hydraulic actuator (160); and another pilot pressure line (184, 190) coupled between said another single-acting hydraulic actuator (158, 160) and said third hydraulic control valve (166, 170) for acting in opposition to a force established by the third solenoid (176, 180) such as to maintain said set-point pressure in said another single-acting hydraulic actuator (158, 160) so as to maintain a constant pressure in the another actuator (158, 160).

\* \* \* \* \*